United States Patent [19]

Ritsko et al.

[11] 3,947,616

[45] Mar. 30, 1976

[54] PROCESS FOR PRODUCING COBALT COATED REFRACTORY METAL CARBIDES

[75] Inventors: Joseph E. Ritsko; Donald S. Parsons, both of Towanda, Pa.

[73] Assignee: GTE Sylvania Incorporated, Stamford, Conn.

[22] Filed: Sept. 27, 1973

[21] Appl. No.: 401,428

[52] U.S. Cl. ............... 427/430; 29/182.7; 427/437
[51] Int. Cl.² ......................................... C04B 35/56
[58] Field of Search .................. 117/160 R, 169 R; 29/182.7, 132; 427/430, 229

[56] References Cited
UNITED STATES PATENTS

| | | |
|---|---|---|
| 2,979,811 | 4/1961 | Toney ................................ 29/182.7 |
| 3,416,955 | 12/1968 | Makowski ........................... 427/430 |

*Primary Examiner*—Ralph S. Kendall
*Assistant Examiner*—Edith R. Buffalow
*Attorney, Agent, or Firm*—Norman J. O'Malley; Donald R. Castle; William H. McNeill

[57] ABSTRACT

Cemented refractory metal carbides are coated with cobalt to a predetermined thickness by immersing a cemented refractory metal carbide in an aqueous slurry consisting essentially of a cobalt source, a hydrazine compound and a buffering agent to provide a pH greater than 7 and maintaining the temperature of the slurry at from about 65° to 90°C for a sufficient time to achieve the desired thickness of cobalt coating on the external surfaces of the cemented refractory metal carbide.

7 Claims, No Drawings

PROCESS FOR PRODUCING COBALT COATED REFRACTORY METAL CARBIDES

BACKGROUND OF THE INVENTION

1. Field of the Invention

This invention relates to refractory metal carbides. More particularly, it relates to refractory metal carbides which have a layer of cobalt over the surfaces and metallurgically bonded to the surfaces of the refractory metal carbide.

2. Prior Art

In U.S. Pat. No. 2,979,811 there is disclosed a method by which some of the cobalt used to cement carbide bodies together migrates to the surfaces of the refractory metal carbide thereby increasing the wettability of the surfaces. In general, the method disclosed in that patent consists of heating the refractory metal carbide to a temperature of 950°F to 1250°F by immersion in a salt bath followed by quenching it in a salt bath at a temperature of approximately 1100°F and thereafter further quenching it in oil or water. The high temperature bath is disclosed as barium chloride and the quenching bath is disclosed as being a mixture of sodium cyanide, potassium chloride and potassium cyanate. The purpose of obtaining a cobalt coating on a refractory metal carbide is to enable the refractory metal carbide to be brazed to other bodies. Such brazing is highly satisfactory wherein carbide tool tips are brazed to metal. Drilling tools, saw blades, snowmobile runners and the like utilize the foregoing concept. While the process disclosed in the foregoing patent can produce a material capable of being brazed to another body, it is believed apparent that high temperatures and the salt bath used to initially heat the body in a cyanide-containing quenching bath affords drawbacks from a processing standpoint and does not strengthen the body since some of the cobalt used as a binder migrates to the surface. It is believed, therefore, that a process which provides an improved coating and enables more conventional processing temperatures and less hazardous materials to be utilized would be an advancement in the art.

OBJECTS AND SUMMARY OF THE INVENTION

It is an object of this invention to provide a refractory metal carbide having a coating of from about 5–15 micrometers of cobalt metallurgically bonded to the external surfaces of the carbide.

It is another object of this invention to provide a refractory metal carbide having a cobalt coating on the surfaces having a higher resistance to shear stresses than uncoated refractory metal carbides.

It is an additional object of this invention to provide a process for obtaining a uniform cobalt coating on the external surfaces of a cemented refractory metal carbide.

These and other objects of this invention are achieved in one embodiment by a process which comprises immersing a cemented refractory metal carbide in an aqueous slurry consisting essentially of a cobalt source, a hydrazine compound and a buffering agent to provide a pH of greater than 7 and to maintain the temperature of the slurry under controlled conditions for a sufficient time to achieve the desired thickness of cobalt coatings on the cemented refractory metal carbide.

DESCRIPTION OF THE PREFERRED EMBODIMENTS

For a better understanding of the present invention, together with other and further objects, advantages and capabilities thereof, reference is made to the following disclosure and appended claims in connection with the above description of some of the aspects of the invention.

The hydrazine compounds which can be utilized in the practice of this invention are water soluble hydrazine compounds of the formula $H_2N-NR_1R_2$ wherein $R_1$ and $R_2$ are each selected from the group consisting of hydrogen and lower alkyl. By lower alkyl as used herein it is meant that the group contains from 1 to 4 carbon atoms. Preferred hydrazine compounds include hydrazine, hydrates of hydrazine containing various percentages of water, methyl hydrazine and unsymmetrical dimethyl hydrazine. For these, hydrazine monohydrate is preferred.

While any cobalt source that is at least soluble to the extent of about 1 gram per 100 cc of water at 25°C can be used, it is generally preferred to use cobalt carbonate since it offers certain economic advantages. Additionally during the subsequent reaction which occurs, carbon dioxide evolves from the slurry. Thus, no potential contaminating material remains in the slurry.

Although any buffering agent can be used which can achieve a pH greater than 7 can be used, potassium carbonate and sodium carbonate are the preferred materials.

Although the strength of the reactants in the aqueous slurry which is formed can be varied over quite a large range and achieve the benefits of this invention, it is generally preferred to use a concentration of cobalt and hydrazine compounds which will yield a total reactant strength of from about 5 to about 25% by weight of the aqueous slurry. Although it is not an essential characteristic of the slurry, generally a cobalt to nitrogen molar ratio of about 1:1 is preferred.

Cemented refractory metal carbides are known in the art. A refractory metal such as tungsten, titanium, tantalum and the like are carburized. One of the iron group of metals, generally cobalt or nickel is used to bind the particles of carbide together. Generally from about 3 to 25% of the cemented body is of the iron group metals and the remainder is one or more of the refractory metal carbides. Minor additives for grain growth inhibitors, corrosion inhibitors can also be added. More details of refractory metal carbides is found in *Cemented Carbides*, Schwarzkopf and Kieffer, MacMillan Co., New York (1960). Although any cemented carbide can be coated in accordance with this invention, it has particular application for tungsten carbide using a cobalt binder.

The length of time the cemented carbide is immersed in the hydrazine-cobalt slurry determines the thickness of the cobalt coating. For most purposes, it is preferred to use a thickness of 5 to 15 micrometers which increases the shear strength of the carbide. To obtain a coating of 5 micrometers, about 20 minutes is required, for a 15 micrometers thick coating about 40 minutes is required. A 10 micrometer thickness maximizes the shear strength of the carbide and is a preferred embodiment.

The temperature of the slurry can vary between about 65°C and 90°C and the coating reaction will occur. Temperatures below about 60°C are not sufficient to cause an appreciable reaction. Temperatures above about 90°C cause evolution of hydrazine from the slurry. Temperatures between about 80°C and 85°C are preferred and yield a satisfactory processing time.

To more fully illustrate the subject invention, the following detailed example is presented. All parts and proportions are by weight unless otherwise indicated.

EXAMPLE I

About 15 parts of hydrazine hydrate, about 20 parts of cobalt carbonate, about 2 parts of potassium carbonate are added to about 400 parts of water.

Four specimens of a cemented tungsten carbide containing about 6% by weight of cobalt as a binder are immersed in the above slurry and the temperature is maintained at 80° to 85°C. Carbide specimens are removed from the slurry after 10, 20, 30 and 40 minutes and the thickness of the cobalt of each specimen is measured. The following table shows the results of the measurements:

| Specimen | Time (Minutes) | Coating Thickness (Micrometers) |
|---|---|---|
| 1 | 10 | 1.1 |
| 2 | 20 | 5 |
| 3 | 30 | 10 |
| 4 | 40 | 15 |

Shear strength tests were run on the foregoing samples. Results of these tests appear below:

| Specimen | Coating Thickness (Micrometers) | Shear (PS 1) |
|---|---|---|
| 1 | 1.1 | 1350 |
| 2 | 5 | 1500 |
| 3 | 10 | 1750 |
| 4 | 15 | 1500 |

A comparison of the results to the shear strength of an uncoated specimen shows that while the 1.1 micrometers coating did not increase the shear strength that specimens 2, 3, and 4 have a significantly higher shear strength than the uncoated specimen.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process suitable for treating cemented refractory carbide bodies, said process comprising:
    a. immersing an uncoated cemented carbide body in an aqueous slurry consisting essentially of a cobalt source, a hydrazine compound and a buffering agent to provide a pH greater than 7 and;
    b. maintaining the temperature of the slurry at from about 65°C to about 90°C for greater than 10 minutes.

2. A process according to claim 1 wherein said hydrazine compound is selected from the group of compounds of the formula:

$$H_2N-N-R_2$$
$$\phantom{H_2N-N-}|$$
$$\phantom{H_2N-N-}R_1$$

wherein $R_1$ and $R_2$ are each selected from the group consisting of hydrogen and lower alkyl.

3. A process according to claim 2 wherein $R_1$ is methyl and $R_2$ is hydrogen.

4. A process according to claim 2 wherein $R_1$ and $R_2$ are methyl.

5. A process according to claim 2 wherein $R_1$ and $R_2$ are hydrogen.

6. A process according to claim 1 wherein said temperature is from about 80° to about 85°C.

7. A process according to claim 6 wherein said hydrazine source is hydrazine.

* * * * *